United States Patent [19]

Bollaert

[11] Patent Number: 5,290,061
[45] Date of Patent: Mar. 1, 1994

[54] FOLDED AIR BAG

[75] Inventor: Matthew C. Bollaert, Capac, Mich.

[73] Assignee: TRW Vehicle Safety Systems Inc., Lyndhurst, Ohio

[21] Appl. No.: 960,916

[22] Filed: Oct. 14, 1992

[51] Int. Cl.$^5$ .................................................. B60R 21/20
[52] U.S. Cl. .................................. 280/743 R; 493/940
[58] Field of Search ............ 280/743 R, 743 A, 728 R; 493/243, 940

[56] References Cited

U.S. PATENT DOCUMENTS

| | | | |
|---|---|---|---|
| 3,748,477 | 7/1973 | Wulbrecht | 280/743 R |
| 3,891,272 | 6/1975 | Takada | 280/743 R X |
| 4,262,931 | 4/1981 | Strasser et al. | 280/743 A X |
| 4,300,894 | 11/1981 | Cumming et al. | 493/243 X |
| 4,351,544 | 9/1982 | Ross | 280/743 |
| 5,022,675 | 6/1991 | Zelenak et al. | 280/743 X |
| 5,162,035 | 11/1992 | Baker | 280/743 X |
| 5,172,934 | 12/1992 | Frantz et al. | 280/743 A X |
| 5,178,407 | 1/1993 | Kelley | 280/743 R X |

Primary Examiner—Margaret A. Focarino
Assistant Examiner—Florian Zeender
Attorney, Agent, or Firm—Tarolli, Sundheim & Covell

[57] ABSTRACT

An inflatable air bag (10) for restraining an occupant (12) of a vehicle (14) has a deflated, folded condition and an inflated, unfolded condition. The air bag has layers (20, 22) defining between them an inflation volume into which gas is directed to inflate the air bag. The air bag when in the inflated and unfolded condition has upper and lower sections (30, 40). The air bag when in the deflated and folded condition has a lower end portion (60) of the air bag disposed between the layers at a location adjacent an upper end portion (50) of the air bag. The lower section of the air bag is turned inside out and located inside the upper section of the air bag. The lower section of the air bag is the final portion of the air bag to unfold when the air bag is inflated.

6 Claims, 4 Drawing Sheets

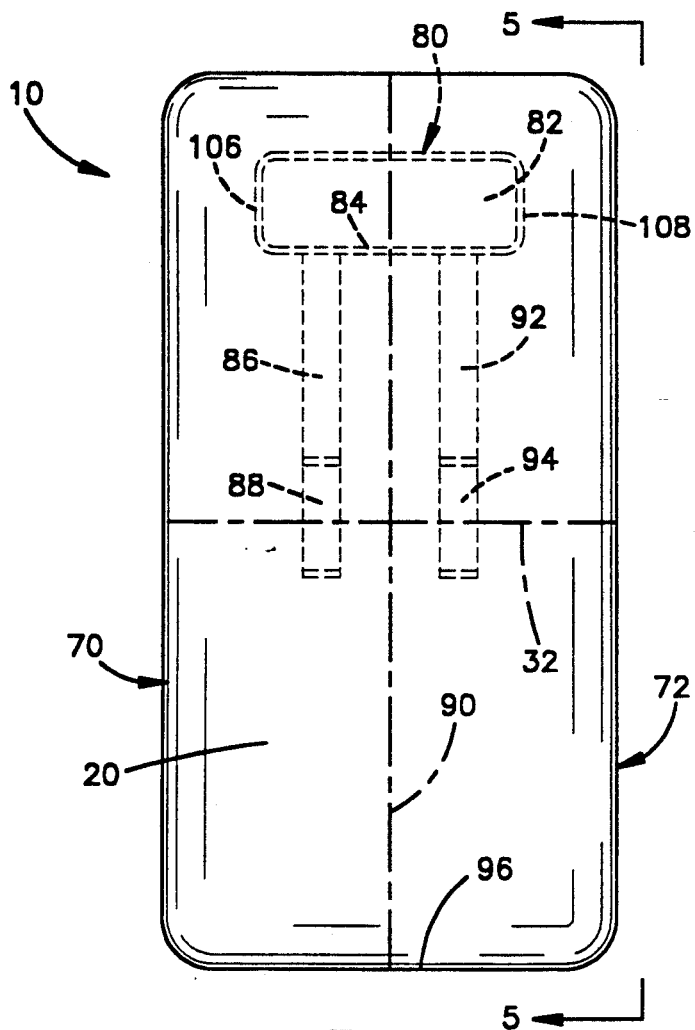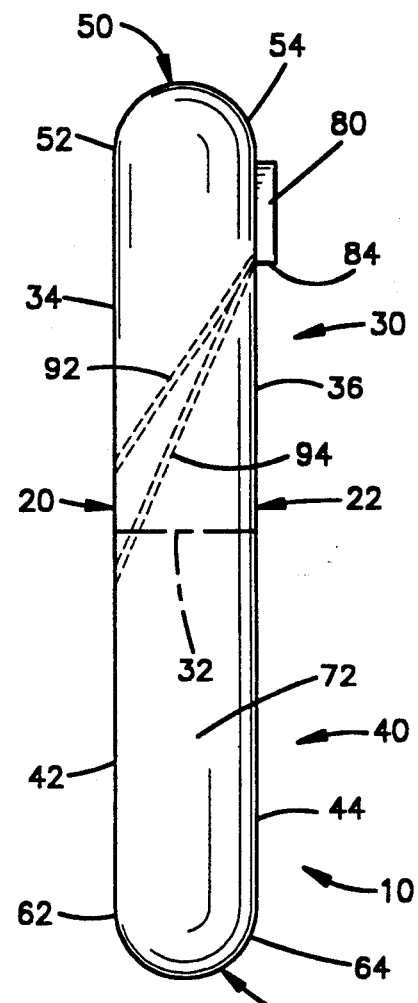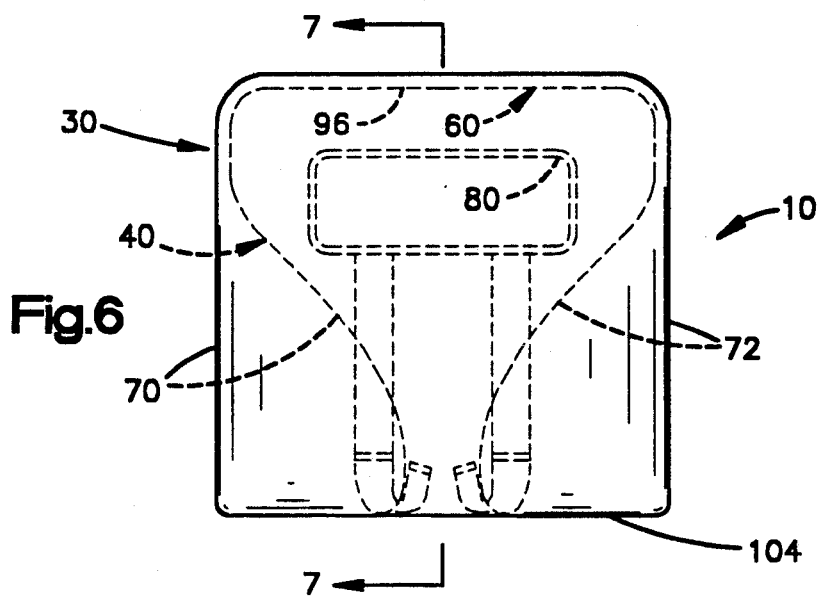

FOLDED AIR BAG

BACKGROUND OF THE INVENTION

1. Technical Field

The present invention relates to an air bag which is inflatable to restrain an occupant of a vehicle during a collision.

2. Description of the Prior Art

An air bag is typically folded and supported in the instrument panel or steering wheel of a vehicle. An inflator assembly is actuated to direct high pressure gas into the air bag to inflate the air bag. The air bag unfolds and inflates. The air bag when inflated restrains a vehicle occupant during sudden vehicle deceleration such as occurs in a collision.

It is preferable that an air bag, when inflating, not brush against the head or upper torso of a vehicle occupant. This is especially desirable if the vehicl occupant is not close to or against the vehicle seat back when the inflator assembly is actuated.

SUMMARY OF THE INVENTION

The present invention is an inflatable air bag for, when inflated, restraining an occupant of a vehicle. The air bag has material layers defining between them an inflation volume into which gas is directed to inflate the air bag. The air bag has a deflated and folded condition and an inflated and unfolded condition. The air bag when in the inflated and unfolded condition has upper and lower sections.

The air bag when in the deflated and folded condition has a lower end section of the air bag disposed between the material layers at a location adjacent an upper end section of the air bag. The lower section of the air bag is turned inside out and located inside the upper section of the air bag. The lower section of the air bag is the final portion of the air bag to unfold when the air bag is inflated. The lower section of the air bag inflates downward toward the vehicle occupant's legs or lower torso, rather than outward toward the vehicle occupant's head or upper torso. This tends to reduce the possibility that the air bag may brush against the head or upper torso of the vehicle occupant as the bag is inflating.

BRIEF DESCRIPTION OF THE DRAWINGS

The foregoing and other features of the present invention will become apparent to one of ordinary skill in the art to which the present invention pertains upon consideration of the following description of the invention with reference to the accompanying drawings, wherein:

FIG. 4 is a front elevational view of the air bag of FIG. 1 in a deflated and unfolded condition;

FIG. 5 is a side elevational view of the air bag of FIG. 4 as viewed along line 5—5;

FIG. 6 is a schematic illustration of the air bag of FIG. 4 after an initial fold of a lower section of the air bag upward into an upper section of the air bag;

DESCRIPTION OF A PREFERRED EMBODIMENT OF THE INVENTION

Figure 1:
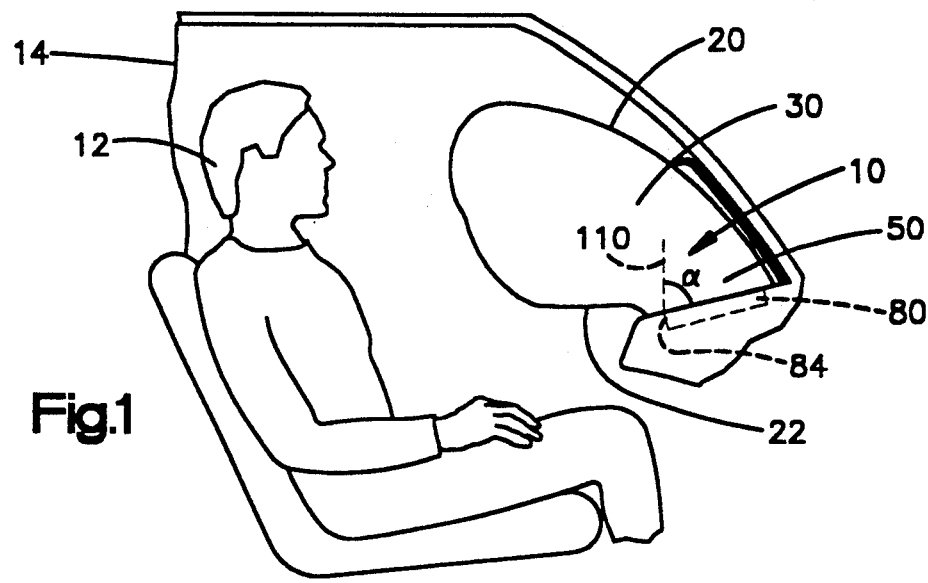
FIGS. 1 through 3 are a series of schematic views illustrating an air bag in accordance with the present invention inflating in a vehicle.

The present invention relates to an air bag for restraining an occupant of a vehicle in the event of sudden vehicle deceleration such as occurs in a collision. The present invention is applicable to various air bag constructions. As representative of the present invention, FIG. 1 illustrates an air bag 10. The air bag 10 is for restraining movement of an occupant 12 of a vehicle 14 in a direction toward the front of the vehicle, that is, to the right as viewed in FIG. 1.

The air bag 10 (FIGS. 4 and 5) includes two material layers (preferably a fabric) which define between them an inflation volume into which gas is directed to inflate the air bag. The two layers include a front panel 20, which is disposed closest to the vehicle occupant 12 when the air bag 10 is inflated, and a back panel 22, which is disposed furthest from the vehicle occupant when the air bag is inflated. The front and back panels 20 and 22 may be separate fabric pieces sewn together, or may be formed as one piece of fabric.

The air bag 10 has an upper section 30 located above (as viewed in FIGS. 4 and 5) an imaginary midline 32 of the air bag. The air bag upper section 30 includes an upper portion 34 of the front panel 20 and an upper portion 36 of the back panel 22. The air bag 10 has a lower section 40 located below (as viewed in FIGS. 4 and 5) the midline 32. The air bag lower section 40 includes a lower portion 42 of the front panel 20 and a lower portion 44 of the back panel 22.

An upper end portion 50 of the air bag 10 includes upper end portions 52 and 54 of the front and back panels 20 and 22, respectively. A lower end portion 60 of the air bag 10 includes lower end portions 62 and 64 of the front and back panels 20 and 22, respectively. The air bag 10 has a left side section 70 and a right side section 72 located on the left and right sides, respectively, (as viewed in FIG. 4) of an imaginary vertical midline 90 of the air bag 10.

The air bag 10 includes a retainer ring 80 secured to and extending outward from the back panel 22. When the air bag 10 is mounted in the vehicle 14, the retainer ring 80 is coupled to an air bag inflator assembly (not shown) on the vehicle 14 to secure the air bag 10 to the inflator assembly. The retainer ring 80 defines an opening 82 in the back panel 22 through which gas from the inflator assembly is directed to inflate the air bag 10.

A plurality of internal tethers extend inside the air bag 10 from the back panel 22, at the lower side 84 of the retainer ring 80, to the front panel 20. A left upper tether 86 and a left lower tether 88 are located to the left (as viewed in FIG. 4) of the imaginary vertical midline 90 of the air bag 10. A right upper tether 92 and a right lower tether 94 are located to the right (as viewed in FIG. 4) of the imaginary vertical midline 90.

Figure 16:
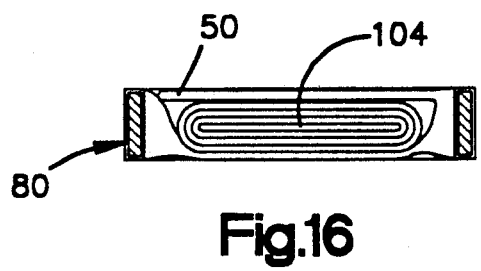

For mounting in the vehicle 14, the air bag 10 is folded from the deflated, unfolded condition shown in FIGS. 4 and 5 into the deflated, folded condition shown in FIG. 16. FIGS. 6 through 16 illustrate the folding of the air bag 10.

Figure 7:
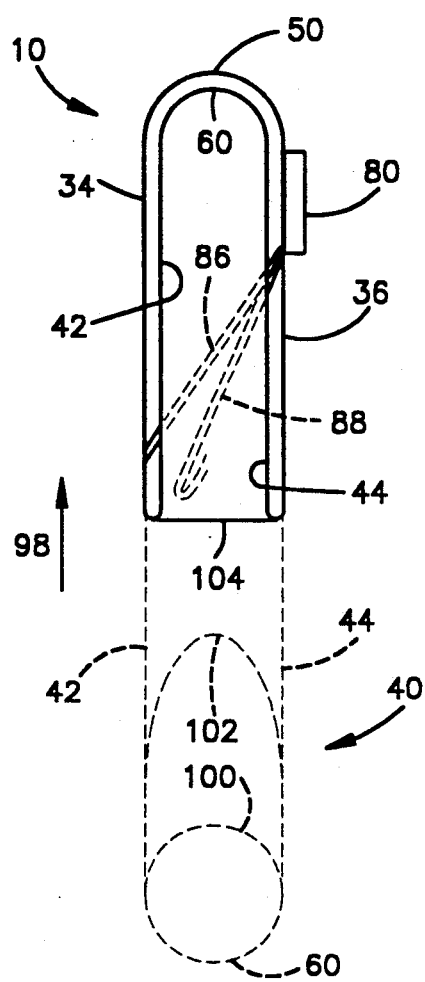
FIG. 7 is a schematic sectional view of the partially folded air bag of FIG. 6, taken along line 7—7 of FIG. 6.

The initial fold of the air bag 10 is illustrated in FIGS. 6 and 7. In this initial fold, the lower section 40 of the air bag 10 is turned inside out and folded up ("tucked up") inside the upper section 30 of the air bag. To fold the air bag 10 in this manner, the air bag lower end portion 60 is moved upwardly, in a direction as indicated by the arrow 98 (FIG. 7), inside the inflation volume between the front panel 20 and the back panel 22. The lower end portion 60 is moved upward as shown schematically in FIG. 7, past the intermediate positions illustrated by the dashed lines 100 and then 102, until the lower end portion is adjacent the upper end portion 50, as shown in solid lines in FIG. 7. While the air bag lower end portion 60 is being moved upward, it passes between the left tethers 86 and 88 on one side and the right tethers 92 and 94 on the other side. When the air bag lower end portion 60 is adjacent the upper end portion 50, the material of the lower end portion is then spread out sideways as much as possible along the upper end portion.

This initial tuck fold can be described in another way with reference to folding the air bag 10 by hand. (It is preferred that the air bag 10 be folded by machine.) If this initial tuck fold is done by hand, the mid-portion 96 of the air bag lower end portion 60 is grasped with one hand and pushed upwardly between the front panel 20 and the back panel 22, and between the left tethers 86 and 88 on one side and the right tethers 92 and 94 on the other side. The lower end portion 60 is pushed upward until it is adjacent the upper end portion 50. Then, both hands are inserted into the air bag 10 and moved sideways apart from each other, so that the air bag lower end portion 60 is spread out sideways as much as possible along the upper end portion 50.

When this initial tuck fold is completed, the air bag 10 is in the partially folded condition shown in FIGS. 6 and 7. The air bag lower section 40 is turned inside out and is located inside the air bag upper section 30. The lower portion 44 of the back panel 22 and the lower portion 42 of the front panel 20 are received between the upper portion 36 of the back panel 22 and the upper portion 34 of the front panel 22. The panel upper portions 36 and 34 form the upper section 30 of the air bag 10 when the air bag is inflated. The panel lower portions 44 and 42 form the lower section 40 of the air bag 10 when the air bag is inflated. In this partially folded condition, the height of the air bag 10, that is, the distance between the upper end portion 50 and the bottom portion 104 of the partially folded air bag, is about half that of the air bag prior to folding.

It should be understood that a folded air bag in accordance with the present invention need not have internal tethers such as the tethers 86, 88, 92 and 94. In such a case, the lower end portion 60 of the air bag 10 is more easily pushed directly into position adjacent the upper end portion 50.

The air bag side sections 70 and 72 are then folded inward toward the retainer ring 80 until the air bag is not wider than the retainer ring. The side sections 70 and 72 may be folded by pleating and rolling as indicated schematically in FIG. 10. Thus, the left side section 70 is folded inward until it does not extend outward of the left side 106 of the retainer ring 80. The right side section 72 is folded inward until it does not extend outward of the right side 108 of the retainer ring 80. Alternatively, the side sections 70 and 72 may be folded by rolling, as indicated schematically in FIG. 11, or by pleating, as indicated schematically in FIG. 12.

Figure 8:
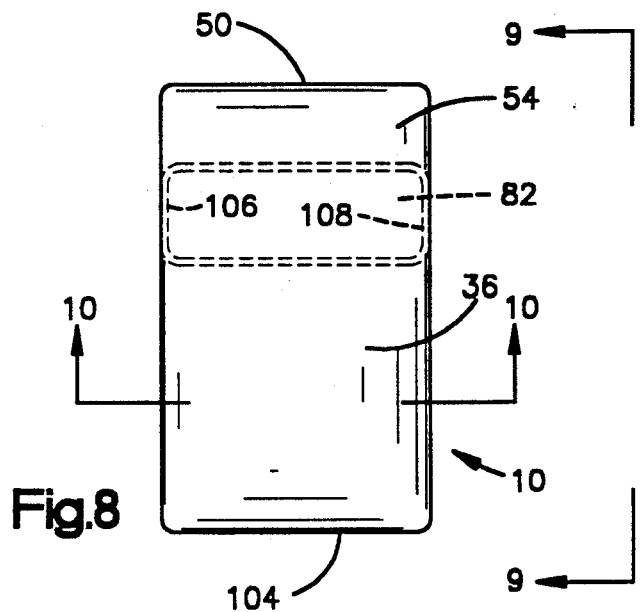
FIG. 8 is a front elevational view of the air bag of FIG. 6 after folding of the sides of the air bag.
Figure 9:
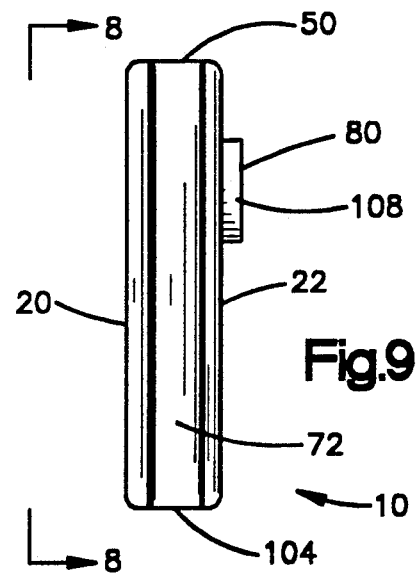
FIG. 9 is a side elevational view of the air bag of FIG. 8 as viewed along line 9—9.
Figure 10:
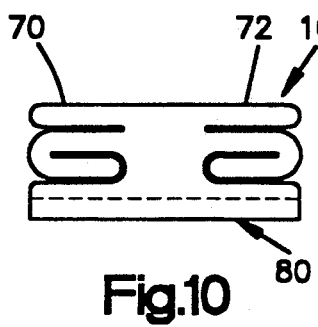
FIG. 10 is a sectional view taken along line 10—10 of FIG. 8 and further illustrating the folded sides of the air bag.
Figure 11:
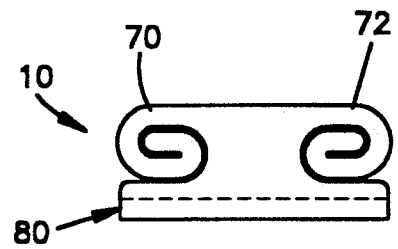
FIG. 11 and 12 are views similar to FIG. 10 illustrating alternate manners of folding the sides of the air bag.
Figure 12:
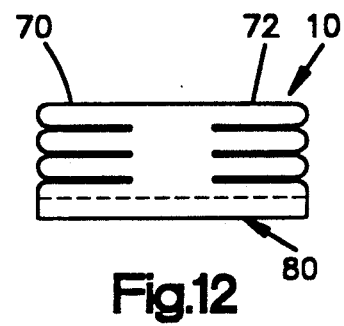
Figure 13:
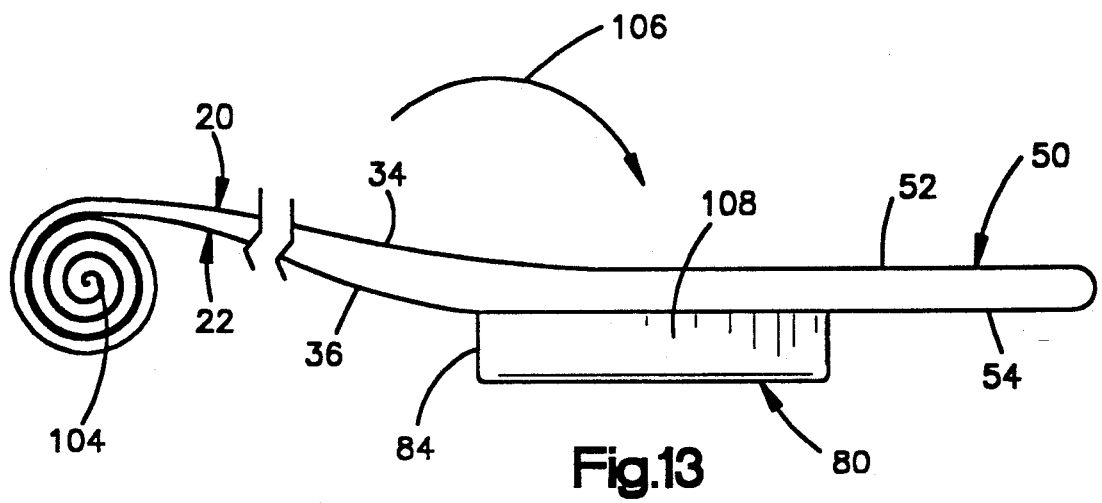
FIGS. 13 through 16 are a series of views illustrating schematically the final folding of the air bag prior to placement of the air bag in the vehicle.
Figure 14:
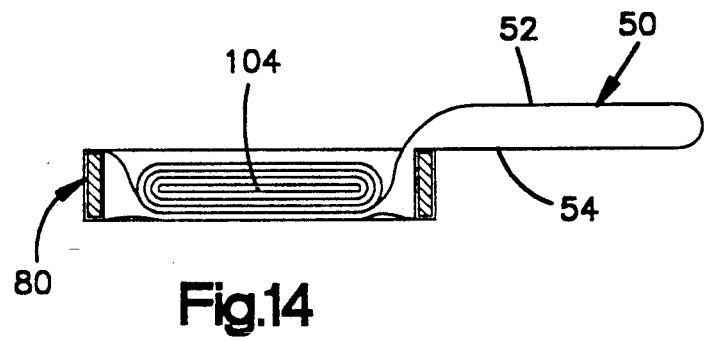
Figure 15:
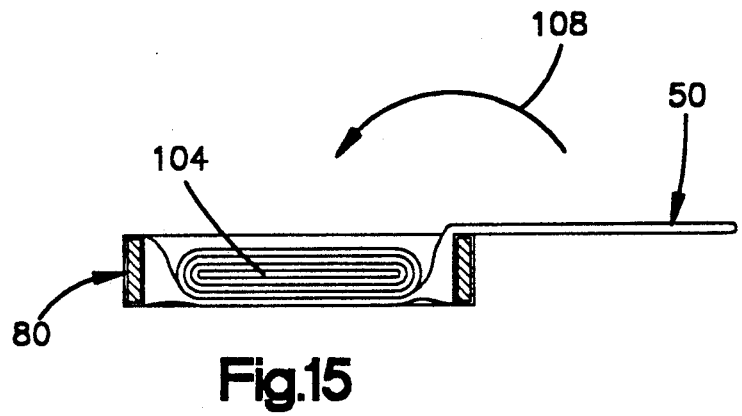

When the side sections 70 and 72 of the air bag are folded, the air bag is in the condition shown in FIGS. 8 and 9. The air bag 10 is then rolled up as illustrated schematically in FIGS. 13–16. The bottom portion 104 of the partially folded air bag is rolled under the front and back panels 20 and 22 toward the retainer ring 80, rolling up the front and back panels 20 and 22, until the roll reaches the bottom side 84 of the retainer ring. The roll is then moved over the bottom side 84 of the retainer ring 80, in a direction as shown by the arrow 106, into a position inside the retainer ring 80. After the roll is flattened, the air bag 10 is then in the condition shown in FIG. 14.

Next, the upper end portion 50 of the air bag 10 is moved or folded in the direction of the arrow 108 into a position inside the retainer ring 80. The air bag 10 is then in the condition shown in FIG. 16. In this condition, the upper end portion 50 of the air bag 10 is outermost (to the top as viewed in FIG. 16) in the retainer ring 80. The air bag 10 may then be secured to an inflator assembly and mounted in the vehicle 14, in a known manner. In the vehicle 14 illustrated in FIGS. 1–3, the retainer ring 80 with the folded air bag inside it, is mounted to lie in a plane that is at an angle $\alpha$ (FIG. 1) of about 70° to 80° from an imaginary vertical line 110. The bottom side 84 of the retainer ring 80 is disposed closest to the vehicle occupant 12. This is generally referred to as a "top mount" configuration.

In the event of sudden vehicle deceleration such as occurs in a collision, an inflator assembly (not shown) in the vehicle 14 (FIG. 1) is actuated in a known manner to direct high pressure gas into the air bag 10 to inflate the air bag. The air bag 10 inflates toward the vehicle occupant 12, that is, toward the left as viewed in FIGS. 1–3.

The portion of the air bag 10 which inflates and unfolds first is the upper end portion 50. Next, the air bag portions which were rolled up into the retainer ring 80 (FIGS. 13–16) unroll and the side sections 70 and 72 inflate and unfold. The internal tethers 86, 88, 92 and 94 help keep the air bag 10 from inflating upward toward the roof of the vehicle 12.

The air bag 10 is then in the partially inflated condition shown in solid lines in FIG. 1. The upper section 30 of the air bag 10 is inflated and is generally in position in front of the head and upper torso of the vehicle occupant 12. The lower section 40 of the air bag 10 (not shown in FIG. 1) is still tucked or folded inside the upper section 30.

The air bag lower section 40 is the final part of the air bag 10 to inflate and unfold. Gas from the inflator assembly continues to be directed into the inflation volume between the air bag front panel 20 and the back panel 22. The lower end portion 60 (FIG. 7) of the air bag 10 moves down and away from its folded position adjacent from the upper end portion 50. The lower section 40 (FIG. 1) of the air bag 10 comes out of the upper section 30, and the air bag 10 is in the inflated, unfolded condition shown in FIG. 3. The tuck fold, i.e., the fold of the air bag lower section 40 up into the upper section 30 as shown in FIGS. 6 and 7, is the last to unfold. The lower section 40 of the air bag 10 is the last part of the bag to inflate.

Folding the lower section 40 of the air bag 10 and turning it inside out into the upper section 30, in the manner described above, limits the free length of the air bag 10 which reaches out towards the vehicle occupant 12 when the air bag inflates. The inflating air bag 10 extends out only about half the distance toward the vehicle occupant 12, then the lower section 40 pops out from the upper section 30 as shown. This tends to reduce the possibility that the air bag 10 may brush against the face or upper torso of the vehicle occupant 12 as the bag is inflating. This is especially advantageous if the vehicle occupant is out of position, i.e., is closer than desired to the air bag 10 when the air bag begins to inflate.

Figure 2:
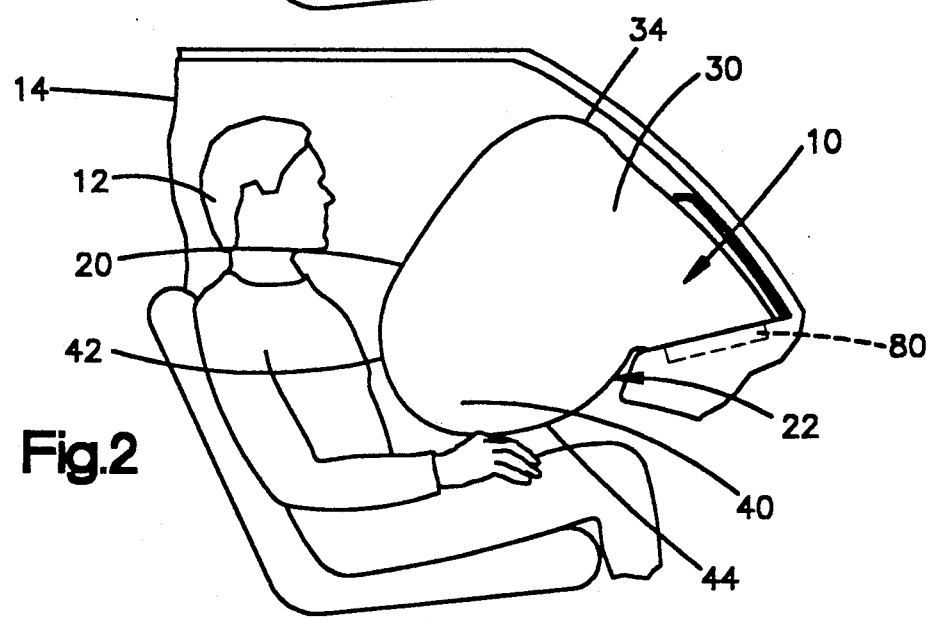
Figure 3:
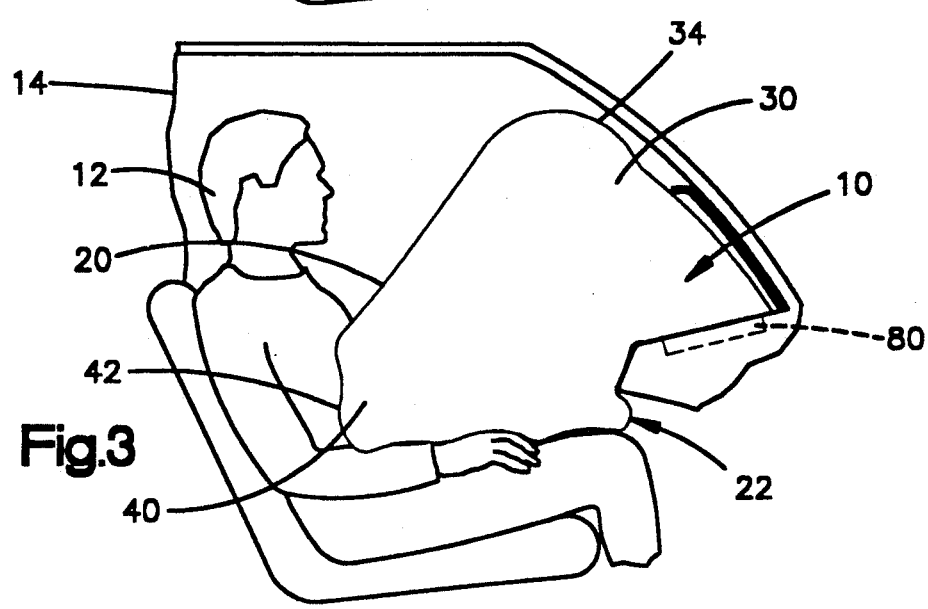

As illustrated in FIGS. 1-3, the air bag 10 is disposed in the vehicle 14 in a top mount configuration. It should be understood that the present invention is applicable to other mounting configurations as well.

From the above description of the invention, those skilled in the art will perceive improvements, changes and modifications in the invention. Such improvements, changes and modifications within the skill of the art are intended to be covered by the appended claims.

I claim:

1. An inflatable air bag for, when inflated, restraining an occupant of a vehicle,
    said air bag having a deflated, folded condition and an inflated, unfolded condition,
    said air bag when in the inflated, unfolded condition having upper and lower sections,
    said air bag when in the deflated, folded condition having a first portion which is turned inside out and received inside a second portion of said air bag, said first portion of said air bag forming said lower section of said air bag when said air bag is in the inflated, unfolded condition, said first portion of said air bag being the final portion of said air bag to unfold when said air bag is inflated,
    said air bag comprising a plurality of layers including a back panel disposed furthest from the vehicle occupant when the air bag is inflated and a front panel disposed closest to the vehicle occupant when the air bag is inflated,
    each of said back panel and said front panel having respective upper and lower portions, said upper portions of said back panel and of said front panel forming said upper section of said air bag when said air bag is inflated, said lower portions of said back panel and of said front panel forming said lower section of said air bag when said air bag is inflated,
    said first portion of said air bag including said lower portions of said back panel and of said front panel.

2. An inflatable air bag as set forth in claim 1 including a retainer ring secured to said back panel of said air bag intermediate said upper and lower end portions of said air bag, said retainer ring defining an opening in said back panel through which gas is directed to inflate said air bag, said retainer ring being disposed in said upper section of said air bag.

3. An inflatable air bag for, when inflated, restraining an occupant of a vehicle,
    said air bag having a deflated, folded condition and an inflated, unfolded condition,
    said air bag when in the inflated, unfolded condition having upper and lower sections,
    said air bag when in the deflated, folded condition having a first portion which is turned inside out and received inside a second portion of said air bag, said first portion of said air bag forming said lower section of said air bag when said air bag is in the inflated, unfolded condition, said first portion of said air bag being the final portion of said air bag to unfold when said air bag is inflated,
    said air bag including a retainer ring defining an opening in said air bag through which gas is directed to inflate said air bag, said air bag having side sections folded inward toward said retainer ring, said air bag with said inward folded side portions being rolled into a compact shape disposed generally within said retainer ring for mounting in the vehicle.

4. An inflatable air bag for, when inflated, restraining an occupant of a vehicle, said air bag comprising first and second layers defining between them an inflation volume into which gas is directed to inflate said air bag,
    said air bag having a deflated, folded condition and an inflated, unfolded condition,
    said air bag when in the inflated, unfolded condition having an upper end portion, a lower end portion, and side sections,
    said air bag when in the deflated and folded condition having said lower end portion of said air bag disposed between said first and second layers at a location adjacent said upper end portion of said air bag and having a first portion of said air bag turned inside out and located inside a second portion of said air bag,
    said layers including a back panel disposed furthest from the vehicle occupant when the air bag is inflated and a front panel disposed closest to the vehicle occupant when the air bag is inflated,
    each of said back panel and said front panel having respective upper and lower portions, said upper portions of said back panel and of said front panel together with said air bag upper end portion forming said upper section of said air bag when said air bag is inflated, said lower portions of said back panel and of said front panel together with said air bag lower end portion forming a lower section of said air bag when said air bag is inflated,
    said first portion of said air bag including said air bag lower end portion and said lower portion of said back panel and said lower portion of said front panel.

5. An inflatable air bag as set forth in claim 4 including a retainer ring secured to said back panel of said air bag intermediate said upper and lower end portions of said air bag, said retainer ring defining an opening through which gas is directed to inflate said air bag.

6. An inflatable air bag for, when inflated, restraining an occupant of a vehicle, said air bag comprising layers defining between them an inflation volume into which gas is directed to inflate said air bag,
    said air bag having a deflated, folded conditions and an inflated, unfolded condition,
    said air bag when in the inflated, unfolded condition having an upper end portion, a lower end portion, and side sections,
    said air bag when in the deflated and folded condition having said lower end portion of said air bag disposed between said first and second layers at a location adjacent said upper end portion of said air bag and having a first portion of said air bag turned inside out and located inside a second portion of said air bag,
    said air bag including a retainer ring defining an opening in said air bag through which gas is directed to inflate said air bag, said air bag having opposite side edge portions folded inward toward said retainer ring, said air bag with said inward folded side portions being rolled up and disposed generally within said retainer ring for mounting in the vehicle.

* * * * *